United States Patent [19]

Milenius

[11] 3,991,031
[45] Nov. 9, 1976

[54] FLEXIBLE POLYACIDS CONTAINING PHOSPHORUS AND/OR HALOGEN COMPONENT AND PROCESS FOR PREPARATION THEREOF

[75] Inventor: David Lee Milenius, Rocky River, Ohio

[73] Assignee: The B. F. Goodrich Company, Akron, Ohio

[22] Filed: Aug. 1, 1975

[21] Appl. No.: 601,041

Related U.S. Application Data

[63] Continuation-in-part of Ser. No. 516,253, Oct. 21, 1974, abandoned.

[52] U.S. Cl. .................. 260/29.6 H; 260/29.6 MP; 260/30.6 R; 260/33.2 R; 260/33.4 R; 260/45.7 P; 260/45.95 L; 260/DIG. 24
[51] Int. Cl.$^2$ ..................... C08K 5/05; C08K 5/06; C08K 5/49; C08L 33/02
[58] Field of Search ............... 260/29.6 H, 29.6 MP, 260/30.6 R, 33.2 R, 33.4 R, 45.7 P, 45.95 L, DIG. 24

[56] References Cited
UNITED STATES PATENTS

| | | | |
|---|---|---|---|
| 2,789,099 | 4/1957 | Rife et al. ...................... | 260/29.6 H |
| 2,798,053 | 7/1957 | Brown........................... | 260/29.6 H |
| 3,099,676 | 7/1963 | Lanham ........................ | 260/30.6 R |
| 3,493,500 | 2/1970 | Volk et al. ...................... | 260/29.6 H |
| 3,658,772 | 4/1972 | Volk et al. ...................... | 260/29.6 H |

OTHER PUBLICATIONS

Modern Plastics Encyclopedia 1970–1971, pp. 854–855, McGraw–Hill) (N.Y.) (Oct. 1970).

Primary Examiner—Donald E. Czaja
Assistant Examiner—H. H. Fletcher
Attorney, Agent, or Firm—Charles A. Crehore; J. Hughes Powell, Jr.

[57] ABSTRACT

A flexible polyacid containing at least one phosphorus and/or halogen-containing component may be prepared readily by (1) mixing together in bulk, solution or dispersion a polyacid and at least one of six hereinafternamed components and (2) drying or conditioning the mixture. The component may be selected from the group consisting of A. at least one di(polyoxyethylene)hydroxymethyl phosphonate having the formula

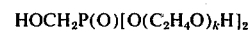

wherein $k$ is from 1 to 5, B. at least one compound having the formula

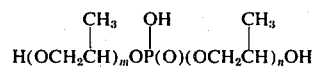

wherein the sum of $m$ and $n$ is from 1 to 35 (C) tetrakis (hydroxymethyl)phosphonium chloride [$(HOCH_2)_4PCl$], (D) a mixture of from about 75% to about 100% by weight 2,2-bis-(bromomethyl)-1,3-propanediol, from about 0% to about 10% by weight monobromoneopentyl triol, and from about 0% to about 20% by weight tribromoneopentyl alcohol (E) diethyl ethyl phosphonate [$C_2H_5P(O)(OC_2H_5)_2$], and (F) a compound having the formula $(RO)_qP(O)[O(C_2H_4O)_rH]_{3-q}$ wherein R is an alkyl group containing from 1 to 5 carbon atoms, $q$ is 1 or 2, and $r$ is from 1 to 4.

18 Claims, No Drawings

1

FLEXIBLE POLYACIDS CONTAINING PHOSPHORUS AND/OR HALOGEN COMPONENT AND PROCESS FOR PREPARATION THEREOF

CROSS REFERENCE TO RELATED APPLICATION

This is a continuation-in-part of my co-pending application Ser. No. 516,253 filed Oct. 21, 1974 and now abandoned.

BACKGROUND OF THE INVENTION

Acrylic acid and methacrylic acid polymers are polyacids known to be generally brittle in the molecular weight range used in this invention. Flexible compositions containing these polymers are desirable. The prior art teaches mixtures of certain phosphorus compounds with thermoplastic polymers. For example, U.S. Pat. No. 3,322,861 teaches use of diphosphonium halides in vinyl resins as flame retardants. However, it is not possible to predict which phosphorus compounds will flexibilize acrylic acid and methacrylic acid polymers. Therefore, it is unexpected and surprising to find that six phosphorus and/or halogen-containing components named hereinafter may be used to produce flexible polyacid compositions.

SUMMARY OF THE INVENTION

A flexible polyacid containing at least one phosphorus and/or halogen-containing component may be prepared readily. The polyacid contains polymerized therein at least one monomer selected from the group consisting of acrylic acid and methacrylic acid. The process comprises (1) mixing together 100 parts by weight of the polyacid and from about 15 to about 400 parts by weight of at least one hereinafter-named component and (2) drying or conditioning the mixture at a temperature from about 20° C to about 150° C. The component may be selected from the group consisting of (A) at least one di(polyoxyethylene)hydroxymethyl phosphonate having the formula

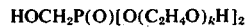

wherein $k$ is from 1 to 5, (B) at least one compound having the formula

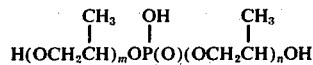

wherein the sum of $m$ and $n$ is from 1 to 35 (C) tetrakis (hydroxymethyl)phosphonium chloride [$(HOCH_2)_4PCl$], (D) a mixture of from about 75% to about 100% by weight 2,2-bis(bromomethyl)-1,3-propanediol, from about 0% to about 10% by weight monobromoneopentyl triol, and from about 0% to about 20% by weight tribromoneopentyl alcohol, (E) diethyl ethyl phosphonate [$C_2H_5P(O)(OC_2H_5)_2$], and (F) a compound having the formula $(RO)_qP(O)[O(C_2H_4O)_rH]_{3-q}$ wherein R is an alkyl group containing from 1 to 5 carbon atoms, $q$ is 1 or 2 and $r$ is from 1 to 4.

DETAILED DESCRIPTION

A flexible polyacid containing at least one phosphorus and/or halogen-containing component may be prepared readily by (1) mixing together in bulk, solution or dispersion a polyacid and at least one of six hereinafter-named components and (2) drying or conditioning the mixture at a temperature from about 20° C to about 150° C, more preferably from about 50° C to about 100° C. The polyacid comprises a polymer of at least 80% by weight of at least one monomer selected from the group consisting of acrylic acid and methacrylic acid. Acrylic acid is more preferred. The polyacid may have a molecular weight from about 50,000 to about 2,000,000 and higher, more preferably from about 100,000 to about 1,000,000. Excellent results were obtained using polyacrylic acid having a molecular weight of about 250,000. The polyacid may contain an average of from about 1.0 to about 1.7 free carboxylic acid groups per 100 molecular weight units.

The polyacid may contain copolymerized therein from 0% up to about 20% by weight, more preferably up to about 10% by weight, of at least one other vinylidene comonomer having at least one terminal $CH_2=C<$ group. Suitable vinylidene comonomers include (a) vinyl aromatics having the formula

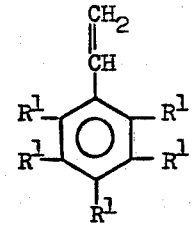

wherein $R^1$ is hydrogen, halogen or an alkyl radical containing from 1 to 4 carbon atoms, such as styrene, α-methyl styrene, chlorostyrene, vinyl toluene, and the like, particularly styrene; (b) vinyl nitriles having the formula

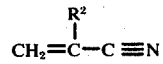

wherein $R^2$ is hydrogen or an alkyl radical containing 1 to 3 carbon atoms, such as acrylonitrile, methacrylonitrile and the like, particularly acrylonitrile; and (c) amides of α,β-olefinically unsaturated carboxylic acids containing 2 to 8 carbon atoms such as acrylamide and the like, particularly acrylamide.

Other suitable vinylidene comonomers having at least one terminal $CH_2=C<$ group include (d) acrylates having the formula

wherein $R^3$ is hydrogen or an alkyl radical containing 1 to 3 carbon atoms and $R^4$ is an alkyl radical containing 1 to 18 carbon atoms, more preferably 1 to 8 carbon atoms, or an alkoxyalkyl, alkylthioalkyl, or cyanoalkyl radical containing 2 to 12 carbon atoms, more preferably 2 to 8 carbon atoms. Even more preferably $R^4$ is an alkyl radical containing 1 to 8 carbon atoms. Examples of suitable acrylates include methyl acrylate, ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, β-cyanoethyl acrylate, cyanooctyl acrylate, methyl methacrylate, ethyl methacrylate, octyl methacrylate and the like, particularly methyl acrylate.

Still other suitable vinylidene comonomers having at least one terminal $CH_2=C<$ group include (e) monoolefins containing 2 to 14 carbon atoms, more preferably 2 to 8 carbon atoms, such as ethylene, propylene, isobutylene, 1-butene, 1-pentene, 1-hexene, 1-dodecene and the like; (f) dienes containing 4 to 10 carbon atoms, more preferably 4 to 8 carbon atoms, such as butadiene, isoprene, 2-isopropyl-1,3-butadiene, chloroprene, and the like; (g) vinyl and allyl esters of carboxylic acids containing 2 to 8 carbon atoms such as vinyl acetate, vinyl propionate, allyl acetate, and the like; (h) vinyl and allyl ethers of alkyl radicals containing 1 to 8 carbon atoms such as vinyl methyl ether, allyl methyl ether, and the like; (i) vinyl halides such as vinyl bromide, vinyl chloride and the like; (j) divinyls and diacrylates such as divinyl benzene, divinyl ether, diethylene glycol diacrylate, and the like; and (k) allyl alcohol and the like.

More preferred vinylidene comonomers having at least one terminal $CH_2=C<$ are the (a) vinyl aromatics, (b) vinyl nitriles, (c) amides of $\alpha,\beta$-olefinically unsaturated acids, and (d) acrylates described heretofore.

Methods of polymerizing and copolymerizing at least one monomer selected from the group consisting of acrylic acid and methacrylic acid are known to the art. Such methods include those described by Eisenberg et al, *J. Polymer Science*, Part A-1, Vol. 7, p. 1718 (1969); Kim et al, *J. Colloid and Interface Science*, Vol. 47, No. 2, p. 531 (1974); McGaugh et al, *Polymer Letters*, Vol. 5, p. 817 (1967); Schildknecht, Calvin E., *Vinyl and Related Polymers*, John Wiley & Sons, Inc., N. Y., 1952, pp. 298–301; and *Encyclopedia of Polymer Science and Technology*, Vol. 1, pp. 203–205 (1964).

The polyacid described heretofore is mixed with at least one of six components selected from the group consisting of (A) at least one di(polyoxyethylene)hydroxymethyl phosphonate having the formula

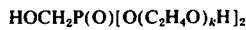
$HOCH_2P(O)[O(C_2H_4O)_kH]_2$ wherein $k$ is from 1 to 5, more preferably 3, (B) at least one compound having the formula

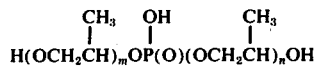
$$\overset{CH_3}{\underset{|}{}} \quad \overset{OH}{\underset{|}{}} \quad \overset{CH_3}{\underset{|}{}}$$
$H(OCH_2CH)_mOP(O)(OCH_2CH)_nOH$ wherein the sum of $m$ and $n$ is from 1 to 35, (C) tetrakis(hydroxymethyl)phosphonium chloride [$(HOCH_2)_4$ PCl], (D) a mixture of from about 75% to about 100% by weight, more preferably about 100% by weight, 2,2-bis(bromomethyl)-1,3-propanediol, from about 0% to about 10% by weight monobromoneopentyl triol, and from about 10% to about 20% by weight tribromoneopentyl alcohol, (E) diethyl ethyl phosphonate [$C_2H_5P(O)(OC_2H_5)_2$] and (F) at least one compound having the formula

$(RO)_qP(O)[C_2H_4O)_rH]_{3-q}$ wherein R is an alkyl group containing from 1 to 5 carbon atoms, more preferably 2 carbon atoms, $q$ is 1 or 2 and $r$ is from 1 to 4. Components A, B, C and D are more preferred. From about 15 to about 400 parts by weight, more preferably from about 20 to about 100 parts by weight, of at least one of the six components described above is used per 100 parts by weight of polyacid.

A preferred method of mixing the polyacid with at least one of the six components described heretofore comprises dissolving or dispersing each material separately in a common inert solvent or nonsolvent or two different inert solvents or nonsolvents, which are miscible with each other, followed by mixing the separate solutions or dispersions. Another preferred method of mixing comprises dissolving the polyacid and component together in a mutually inert solvent. Still another preferred method comprises mixing the polyacid and component together in a mutually inert nonsolvent. In the latter process the polyacid and component tend to agglomerate as a single mass and are separated readily from the nonsolvent by methods such as centrifugation and the like.

A more preferred method of mixing the polyacid with at least one of the six components described heretofore is by purely mechanical means in the absence of a solvent using a Beken Mixer, Banbury, two-roll mill or the like. Another more preferred alternative is to mix a bulk mass of one of the materials with a solution of the other.

Suitable polyacid solvents include water, dioxane, dimethylformamide, and simple alcohols containing from 1 to 5 carbon atoms such as methanol, ethanol and 2-propanol. Suitable polyacid nonsolvents include acetone; diethyl ether; alkanes and cycloalkanes containing from 5 to 10 carbon atoms, such as pentane, hexane, cyclohexane and the like; and aromatic compounds containing from 6 to 14 carbon atoms, such as benzene, toluene, xylene, mesitylene and the like. An aqueous polyacrylic acid solution typically contains from about 5% to about 30% by weight polyacrylic acid based upon a combined weight of polyacrylic acid and water.

Drying or conditioning of the mixture may be performed at a temperature from about 20° C to about 150° C, more preferably from about 50° C to about 100° C. Water solubility was found to decrease with increasing temperature and time of drying or conditioning. The mixture may be recovered from solution by drying in air or under a vacuum. The exact nature of interaction between the polyacid and the phosphorus and/or halogen-containing component is not fully understood.

The point at which the phosphorus and/or halogen-containing component becomes unsuitable or incompatible with the polyacid may be determined readily by a number of methods. Exudation of the component may indicate incompatibility. Furthermore, increasing the amount of the phosphorus and/or halogen-containing component increases the elongation and decreases the tensile strength of the flexible polyacid; therefore, if a film possessing high tensile strength is desired, the amount of phosphorus and/or halogen-containing component should be kept near the lower limit. Alternatively a curing agent may be used to enhance tensile strength. Finally, the compatibility of the phosphorus and/or halogen-containing component may increase with a decrease in polyacid molecular weight.

Certain curing agents have been found which enhance properties such as tensile strength of the compositions of this invention without affecting flexibility adversely. Such agents include epoxy resins; amines, alkanolamines and polymers thereof; azetidinium chloride polymers; and hydrogen peroxide. Suitable epoxy resins include glyceryl triglycidyl ether, propylene glycol diglycidyl ether and the like. Suitable amines, alkanolamines and polymers thereof include dicyandiamide, triethanolamine, polyvinyl pyrrolidone having a molecular weight ($M_n$) from about 10,000 to about 500,000, more preferably about 150,000; and the like.

The flexible polyacids containing at least one phosphorus and/or halogen-containing component may be prepared in the presence of or may have added to them substantial, even major amounts, of materials which do not form part of the flexible polyacids. If added during preparation of the flexible polyacids, the materials should be chosen so as not to exert an inhibiting effect thereon. Such additives include solvents for the polyacids and six components described heretofore. Other useful additives include fillers such as calcium carbonate, the neutral clays, mica, carbon blacks and wood flour; and also dyes, pigments, surfactants, dispersants, flatting agents and the like.

The flexible polyacids containing at least one phosphorus and/or halogen-containing component possess excellent properties, and it is not necessary to add secondary plasticizers or softening agents. However, such secondary materials may be used in amounts up to about 30 parts per 100 parts by weight of polyacid in addition to the phosphorus and/or halogen-containing component.

Secondary plasticizers and softening agents useful in amounts described above include glycols, triols and higher polyols, and glycol ethers having a molecular weight from about 60 to about 6,000. Preferred glycols contain from 2 to 12 carbon atoms and may contain up to two unsaturated bonds. More preferred glycols contain from 2 to 8 carbon atoms and are fully saturated. Suitable glycols include ethylene glycol, 1,3-butanediol, 1,4-butanediol, 1,5-pentanediol, hexylene glycol and the like. Preferred triols contain from 3 to 12 carbon atoms and are fully saturated or contain a single unsaturated carbon-carbon bond. More preferred triols contain from 3 to 6 carbon atoms and are fully saturated, such as glycerol and the like. Preferred higher polyols contain from 4 to 12 carbon atoms, from 4 to 6 hydroxyl groups and are fully saturated or have a single unsaturated carbon-carbon bond. More preferred higher polyols contain from 4 to 8 carbon atoms, from 4 to 6 hydroxyl groups and are fully saturated, such as pentaerythritol and the like. Preferred glycol ethers have a molecular weight from about 90 to about 6,000, more preferably from about 90 to about 1,000, such as diethylene glycol, triethylene glycol, dipropylene glycol and polyethylene glycol. The plasticizers described above may aid in increasing further the flexibility of the flexible polyacids of this invention, particularly flexible polyacids containing diethyl ethyl phosphonate [$C_2H_5P(O)(OC_2H_5)_2$] or a compound having the formula $$(RO)_qP(O)[O(C_2H_4O)_rH]_{3-q}$$

wherein R is an alkyl group containing 1 to 4 carbon atoms, more preferably 2 carbon atoms, $q$ is 1 or 2 and $r$ is from 1 to 4. The following examples illustrate the present invention more fully.

EXAMPLES 1 – 12

In each of the following examples the polyacid used was an acrylic acid homopolymer having a specific gravity of about 1.4 and a molecular weight of about 250,000. A 15% solution of the polyacrylic acid was prepared by sifting 150 grams of the acid into 850 grams of distilled water agitated by a Premier Type SD Dispersator. The mixture was deaerated by allowing to stand overnight. Two-mil film was then cast from the mixture onto a poly(methyl methacrylate) substrate using a Gardner knife applicator. The film was dried at 60° C for 4 hours. The film was stored between polyethylene film layers for later testing.

Film flexibility was tested by bending a sample once slowly at one section of the sample and then once rapidly at another fresh section of the same sample. Samples were rated for flexibility as follows:

| | |
|---|---|
| Flexible — | no cracking at all after either slow or rapid flexion; |
| Slightly brittle — | no cracking after slow flexion, but minor stress/strain marks appeared after rapid flexion; |
| Brittle — | sample broke into two pieces during slow flexion. |

Water solubility of each sample was tested by stirring 2 grams of 2-mil film into 25 ml of water at 25° C using a rotator mixer at 24 rpm. The time required to achieve complete solution was measured, with a sample rated insoluble if it did not dissolve in 24 hours. Test results are summarized in Table I.

TABLE I

| Example | Component | Component Parts/70 Parts Polyacrylic Acid | Flexibility | Water Solution Time (Min.) |
|---|---|---|---|---|
| 1 | Mixture having the formula $HOCH_2P(O)[O(C_2H_4O)_kH]_2$ where k = 1 to 5 | 30 | Flexible | Insoluble |
| 2 | Mixture having the formula 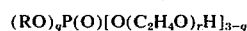 $H(OCH_2CH)_m$—O—$P(O)$—$(OCH_2CH)_nOH$ wherein m + n is from 1 to 35 | 30 | Flexible | 5 – 10 |
| 3 | $(HOCH_2)_4PCl$ | 30 | Flexible | 5 – 10 |
| 4 | $(HOCH_2)_4PCl$ | 15 + 15 pts Triethylene Glycol | Flexible | 10 – 15 |
| 5 | Mixture of 80 – 82% $(HOCH_2)_2C(CH_2Br)_2$ 5 – 7% $(HOCH_2)_3C\ CH_2Br$ 13 – 15% $HOCH_2C\ (CH_2Br)_3$ | 30 | Flexible | < 5 |
| 6 | $C_2H_5P(O)(OC_2H_5)_2$ | 30 | Slightly Brittle | < 5 |
| 7 | $C_2H_5P(O)(OC_2H_5)_2$ | 15 + 15 pts Triethylene Glycol | Flexible | < 5 |
| 8 | Mixture having the formula | | | |

TABLE I-continued

| Example | Component | Component Parts/70 Parts Polyacrylic Acid | Flexibility | Water Solution Time (Min.) |
|---|---|---|---|---|
|  | $(RO)_qP(O)[O(C_2H_4O)_rH]_{3-q}$ | 30 | Slightly Brittle | 5 |
|  | where R = alkyl group containing 2 carbon atoms, q = 1 or 2 and r = 1 to 4 | | | |
| 9 | Mixture having the formula $(RO)_qP(O)[O(C_2H_4O)_rH]_{3-q}$ where R = alkyl group containing 2 carbon atoms, q = 1 or 2 and r = 1 to 4 | 15 + 15 pts Triethylene Glycol | Flexible | 5 – 10 |
| 10 | $(C_2H_5O)_2P(O)CH_2N(C_2H_4OH)_2$ | 30 | Brittle | < 5 |
| 11 | Mixture having the formula 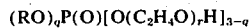 $(R'O)_2P(O)C_2H_4-\overset{O}{\overset{\|}{C}}-\overset{H}{\overset{\|}{N}}-CH_2OH$ where R' = alkyl group containing from 1 to 2 carbon atoms | 30 | Brittle | — |
| 12 | $(ClC_2H_4O)_3P(O)$ | 30 | Brittle | 5 – 10 |

Examples 1 to 9 illustrate the utility of six specific phosphorus and/or halogen-containing components in producing a flexible phosphorus and/or halogen-containing polyacrylic acid. Examples 4, 7 and 9 illustrate the utility of triethylene glycol as a secondary plasticizer, particularly in eliminating the slight brittleness which otherwise may occur with use of diethyl ethyl phosphonate alone (Example 6) or a compound having the formula $(RO)_qP(O)[O(C_2H_4O)_rH]_{3-q}$ (Example 8). Example 5 was particularly interesting, since a solid, flaked component (the mixture of three compounds listed) was used to treat a brittle plastic (polyacrylic acid) in order to produce a flexible film.

Examples 10 to 12 illustrate the brittle polyacrylic acid composition which results when several other phosphorus and/or halogen-containing components are used. It was not possible to predict in advance which components would produce a flexible polyacrylic acid product.

Flexible 2-mil films from Examples 1 – 3 were tested for flammability by holding each sample vertically in a match flame for 15 seconds and then removing the flame. All samples but Example 7 were self-extinguishing.

The products of this invention are generally clear and have a combination of flexibility and variable water solubility, often together with flame retardance. These properties make the products useful for printing pastes, upholstery and carpet backings and other shaped articles, diaper liners, coatings for foamed products such as polyurethane foam mattresses, garment finishing and the like.

I claim:

1. A flexible composition of matter comprising
  A. 100 parts by weight of a polyacid containing polymerized therein at least 80% by weight of at least one monomer selected from the group consisting of acrylic acid and methacrylic acid and up to about 20% by weight of at least one other vinylidene comonomer having at least one terminal $CH_2=C<$ group, said polyacid having a molecular weight from about 50,000 to about 2,000,000 and containing an average of from about 1.0 to about 1.7 free carboxylic acid groups per 100 molecular weight units, and
  B. from about 15 to about 400 parts by weight of at least one component selected from the group consisting of 1. at least one di(polyoxyethylene)hydroxymethyl phosphonate having the formula $HOCH_2P(O)[C_2H_4O)_kH]_2$ wherein k is from 1 to 5,
  2. at least one compound having the formula

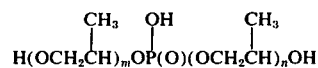

wherein the sum of m and n is from 1 to 35,
  3. tetrakis(hydroxymethyl)phosphonium chloride,
  4. a mixture of from about 75% to about 100% by weight of 2,2-bis(bromomethyl)-1,3-propanediol, from about 0% to about 10% by weight monobromoneopentyl triol, and from about 0% to about 20% by weight tribromoneopentyl alcohol,
  5. diethyl ethyl phosphonate, and
  6. at least one compound having the formula $(RO)_qP(O)[O(C_2H_4O)_rH]_{3-q}$ wherein R is an alkyl group containing from 1 to 5 carbon atoms, q is 1 or 2, and r is from 1 to 4.
2. A composition of claim 1 wherein said comonomer is selected from the group consisting of
  A. vinyl aromatics having the formula

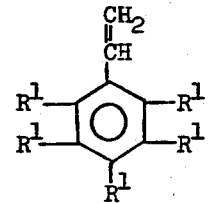

wherein $R^1$ is hydrogen, halogen or an alkyl radical containing from 1 to 4 carbon atoms,
  B. vinyl nitriles having the formula

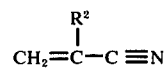

wherein $R^2$ is hydrogen or an alkyl radical containing 1 to 3 carbon atoms,

C. amides of α,β-olefinically unsaturated carboxylic acids containing 2 to 8 carbon atoms, and
D. acrylates having the formula $$CH_2=C(R^3)-C(=O)-O-R^4$$

wherein $R^3$ is hydrogen or an alkyl radical containing 1 to 3 carbon atoms and $R^4$ is alkyl radical containing 1 to 18 carbon atoms or an alkoxyalkyl, alkylthioalkyl or cyanoalkyl radical containing 2 to 12 carbon atoms.

3. A composition of claim 1 wherein said polyacid has a molecular weight from about 100,000 to about 1,000,000.

4. A composition of claim 3 wherein said polyacid is polyacrylic acid.

5. A composition of claim 4 wherein (B) is from about 20 to about 50 parts by weight, $p$ is 3, (4) is 2,2-bis (bromomethyl)-1,3-propanediol, and R contains 2 carbon atoms.

6. A composition of claim 1 containing a plasticizer selected from the group consisting of saturated glycols containing from 2 to 8 carbon atoms, saturated triols containing from 3 to 6 carbon atoms, saturated higher polyols containing from 4 to 8 carbon atoms and from 4 to 6 hydroxyl groups, and glycol ethers having a molecular weight from about 90 to about 6,000.

7. A composition of claim 6 wherein said plasticizer is a glycol ether having a molecular weight from about 90 to about 6,000.

8. A composition of claim 7 wherein said glycol ether is triethylene glycol.

9. An aqueous film-forming composition of matter comprising
A. an aqueous solution of polyacrylic acid having a molecular weight from about 50,000 to about 2,000,000, and
B. at least one component selected from the group consisting of
1. at least one di(polyoxyethylene)hydroxymethyl phosphonate having the formula $$HOCH_2P(O)[O(C_2H_4O)_kH]_2$$

wherein $k$ is from 1 to 5,
2. at least one compound having the formula $$H(OCH_2CH(CH_3))_mOP(O)(OH)(OCH_2CH(CH_3))_nOH$$

wherein the sum of $m$ and $n$ is from 1 to 35,
3. tetrakis(hydroxymethyl)phosphonium chloride,
4. a mixture of from about 75% to about 100% by weight of 2,2-bis(bromomethyl)-1,3-propanediol, from about 0% to about 10% by weight monobromoneopentyl triol, and from about 0% to about 20% by weight tribromoneopentyl alcohol,
5. diethyl ethyl phosphonate, and
6. at least one compound having the formula $$(RO)_qP(O)[O(C_2H_4O)_rH]_{3-q}$$

wherein R is an alkyl group containing from 1 to 5 carbon atoms, $q$ is 1 or 2, and $r$ is from 1 to 4, said component (B) being present in an amount of from about 15 to about 400 parts by weight based upon 100 parts by weight of polyacrylic acid, and said aqueous solution containing from about 5% to about 30% by weight polyacrylic acid based upon a combined weight of polyacrylic acid and water.

10. A clear, shaped article comprising
A. 100 parts by weight of polyacrylic acid having a molecular weight from about 50,000 to about 2,000,000 and,
B. from about 15 to about 400 parts by weight of at least one component selected from the group consisting of
1. at least one di(polyoxyethylene)hydroxymethyl phosphonate having the formula $$HOCH_2P(O)[O(C_2H_4O)_kH]_2$$

wherein $k$ is from 1 to 5,
2. at least one compound having the formula $$H(OCH_2CH(CH_3))_mOP(O)(OH)(OCH_2CH(CH_3))_nOH$$

wherein the sum of $m$ and $n$ is from 1 to 35,
3. tetrakis(hydroxymethyl)phosphonium chloride,
4. a mixture of from about 75% to about 100% by weight of 2,2-bis(bromomethyl)-1,3-propanediol, from about 0% to about 10% by weight monobromoneopentyl triol, and from about 0% to about 20% by weight tribromoneopentyl alcohol,
5. diethyl ethyl phosphonate, and
6. at least one compound having the formula $$(RO)_qP(O)[O(C_2H_4O)_rH]_{3-q}$$

wherein R is an alkyl group containing from 1 to 5 carbon atoms, $q$ is 1 or 2, and $r$ is from 1 to 4.

11. A process for the production of a flexible polyacid which comprises
A. mixing together
1. 100 parts by weight of a polyacid containing polymerized therein at least 80% by weight of at least one monomer selected from the group consisting of acrylic acid and methacrylic acid, and up to about 20% by weight of at least one other vinylidene comonomer having at least one terminal $CH_2 = C<$ group, said polyacid having a molecular weight from about 50,000 to about 2,000,000 and containing an average of from about 1.0 to about 1.7 free carboxylic acid groups per 100 molecular weight units, and
2. from about 15 to about 400 parts by weight of at least one component selected from the group consisting of
a. at least one di(polyoxyethylene)hydroxymethyl phosphonate having the formula $$HOCH_2P(O)[O(C_2H_4O)_kH]_2$$

wherein $k$ is from 1 to 5,
b. at least one compound having the formula $$H(OCH_2CH(CH_3))_mOP(O)(OCH_2-CH(CH_3))_nOH$$

wherein the sum of m and n is from 1 to 35,
c. tetrakis(hydroxymethyl)phosphonium chloride,
d. a mixture of from about 75% to about 100% by weight of 2,2-bis(bromomethyl)-1,3-propanediol, from about 0% to about 10% by weight monobromoneopentyl triol, and from about 0% to about 20% by weight tribromoneopentyl alcohol,
e. diethyl ethyl phosphonate, and
f. at least one compound having the formula (RO)$_q$P(O)[O(C$_2$H$_4$O)$_r$H]$_{3-q}$ wherein R is an alkyl group containing from 1 to 5 carbon atoms, q is 1 or 2, and r is from 1 to 4, and
B. drying or conditioning the mixture at a temperature from about 20° C to about 150° C.

12. A process of claim 11 wherein said comonomer is selected from the group consisting of
A. vinyl aromatics having the formula

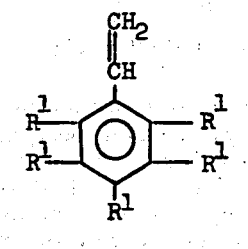

wherein R$^1$ is hydrogen, halogen or an alkyl radical containing from 1 to 4 carbon atoms,
B. vinyl nitriles having the formula

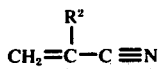

wherein R$^2$ is hydrogen or an alkyl radical containing 1 to 3 carbon atoms,
C. amides of α,β-olefinically unsaturated carboxylic acids containing 2 to 8 carbon atoms, and
D. acrylates having the formula

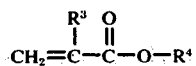

wherein R$^3$ is hydrogen or an alkyl radical containing 1 to 3 carbon atoms and R$^4$ is alkyl radical containing 1 to 18 carbon atoms or an alkoxyalkyl, alkylthioalkyl or cyanoalkyl radical containing 2 to 12 carbon atoms.

13. A process of claim 11 wherein said polyacid has a molecular weight from about 100,000 to about 1,000,000.

14. A process of claim 13 wherein said polyacid is polyacrylic acid.

15. A process of claim 14 wherein (2) is from about 20 to about 50 parts by weight, p is 3 and (d) is 2,2-bis(bromomethyl)-1,3-propanediol, and R contains 2 carbon atoms.

16. A process of claim 11 wherein said flexible polyacid contains a plasticizer selected from the group consisting of saturated glycols containing from 2 to 8 carbon atoms, saturated triols containing from 3 to 6 carbon atoms, saturated higher polyols containing from 4 to 8 carbon atoms and from 4 to 6 hydroxyl groups, and glycol ethers having a molecular weight from about 90 to about 6,000.

17. A process of claim 16 wherein said plasticizer is a glycol ether having a molecular weight from about 90 to 6,000.

18. A process of claim 17 wherein said glycol ether is triethylene glycol.

* * * * *

UNITED STATES PATENT OFFICE
CERTIFICATE OF CORRECTION

PATENT NO. : 3,991,031
DATED : November 9, 1976
INVENTOR(S) : David Lee Milenius It is certified that error appears in the above-identified patent and that said Letters Patent are hereby corrected as shown below:

Column 3, line 57 "10%" should read ---0%---.

Signed and Sealed this

Twenty-second Day of March 1977

[SEAL]

Attest:

RUTH C. MASON
*Attesting Officer*

C. MARSHALL DANN
*Commissioner of Patents and Trademarks*